United States Patent
Schilling et al.

(12) 
(10) Patent No.: US 6,423,759 B1
(45) Date of Patent: Jul. 23, 2002

(54) CO-INITIATED POLYOLS USEFUL FOR THE PRODUCTION OF RIGID POLYURETHANE FOAMS

(75) Inventors: Steven L. Schilling; Herman P. Doerge, both of Pittsburgh, PA (US); Edward E. Ball, Weirton; Keith J. Headley, Paden City, both of WV (US)

(73) Assignee: Bayer Corporation, Pittsburgh, PA (US)

( * ) Notice: Subject to any disclaimer, the term of this patent is extended or adjusted under 35 U.S.C. 154(b) by 34 days.

(21) Appl. No.: 09/742,974

(22) Filed: Dec. 20, 2000

(51) Int. Cl.[7] .......................... C08G 18/08; C09K 3/00
(52) U.S. Cl. ............ 521/174; 252/182.24; 252/182.25; 252/182.26; 252/182.27; 521/128; 521/129
(58) Field of Search .................... 252/182.24, 182.25, 252/182.26, 182.27; 521/128, 129, 174

(56) References Cited

U.S. PATENT DOCUMENTS

| | | | |
|---|---|---|---|
| 3,085,085 A | | 4/1963 | Wismer et al. |
| 3,941,769 A | | 3/1976 | Maassen et al. |
| 5,296,516 A | * | 3/1994 | Krueger et al. ............. 521/131 |
| 5,596,059 A | | 1/1997 | Hager et al. |
| 5,684,057 A | | 11/1997 | White, III et al. .......... 521/167 |
| 6,348,161 B1 | * | 2/2002 | White et al. ........... 252/182.24 |

* cited by examiner

Primary Examiner—John M. Cooney, Jr.
(74) Attorney, Agent, or Firm—Joseph C. Gil; Lyndanne M. Whalen

(57) ABSTRACT

A co-initiated polyether polyol is produced by suspending a solid polyhydroxyl compound in an amine-initiated polyol, heating the suspension and alkoxylating the heated suspension. These co-initiated polyether polyols are particularly useful for the production of polyurethanes.

17 Claims, No Drawings

CO-INITIATED POLYOLS USEFUL FOR THE PRODUCTION OF RIGID POLYURETHANE FOAMS

BACKGROUND OF THE INVENTION

The present invention relates to co-initiated polyether polyols useful for the production of rigid polyurethane foams and to a process for the production of such co-initiated polyols.

Processes for the production of polyether polyols from materials which are normally solid at ambient conditions such as sucrose are known. In many of the known processes, the solid material is dissolved or suspended in a solvent prior to reaction with the selected alkylene oxide(s) to facilitate processing of the reaction mixture. The solvent can either be an inert material such that disclosed in U.S. Pat. No. 3,941,769 or a reactive material such as water (U.S. Pat. No. 5,596,059).

The presence of water or an inert organic solvent during the reaction of the solid material with the alkylene oxide, however, is undesirable for a number of reasons. First, the solvent takes up space in the reactor which might otherwise be used to produce larger batches of polyol. Second, the solvent or unreacted water must be removed, usually by distillation. Such removal consumes both time and energy. Finally, if water is used to suspend or dissolve the sucrose, difunctional glycols which reduce the average functionality of the polyol produced are formed. One proposed solution to this problem is removal of the solvent by distillation after a portion of the alkylene oxide has been added. (See, e.g., U.S. Pat. No. 3,085,085 which discloses removal of water by distillation.) Such removal of water after adding and reacting a portion of the total alkylene oxide desired reduces the amount of glycols formed and allows for a larger batch size but still consumes time and energy.

In commercial processes for the production of polyurethane foams, mixtures or blends of individual polyols are generally used as the polyol component to be reacted with the isocyanate component. Use of such mixtures makes it possible to produce polymers having specific physical properties suited for a particular application.

When developing new systems, combination of individual polyols makes it easier to optimize a system for the production of polymers having a desired combination of properties. However, once a system has been optimized, the flexibility achieved by use of individual polyols is no longer necessary. This is particularly true where one or more of the polyols in the optimized system is difficult to manufacture such as polyols based on solid initiators such as sucrose. In such cases, it may be desirable to produce a co-initiated polyol which duplicates the properties obtained from the blend of individual polyols.

In U.S. Pat. No. 5,684,057, for example, a polyol composition to produce a rigid foam having improved thermal insulation and dimensional stability when specified blowing agents were used was sought. The polyol composition developed includes at least three different types of polyol. The polyol composition required in this patented process includes: (1) an aromatic amine-initiated polyether polyol, (2) an aliphatic amine-initiated polyether polyol, and (3) a polyester polyol. This patent teaches that the individual polyols may be combined prior to reaction with the polyisocyanate. It is preferred, however, that the aromatic amine-initiated and aliphatic amine-initiated polyols be prepared by a co-initiation process in which the aliphatic and aromatic amine initiators are first blended together and the resultant blend is subsequently alkoxylated. The required polyester polyol is then added to the propoxylated blend.

U.S. Pat. No. 5,596,059 discloses polyol blends for the production of flexible foams which do not require the use of expensive initiators such as glycerine or of solvents such as toluene. These polyol blends are prepared by alkoxylating aqueous solutions of one or more solid, polyhydric, hydroxy-functional initiators to produce a blend of low functionality diols and higher functionality polyols. A key feature of this process, is the alkoxylation of the water used as solvent. This alkoxylation of water eliminates the need for water removal and the need to use expensive conventional initiators such as glycerine or solvents. Water co-initiated polyols such as these, however, are not useful for the production of rigid polyurethane foams because of their low functionalities and hydroxyl numbers.

A polyol blend for the production of rigid polyurethane foams which could be prepared from a solid polyhydroxyl compound initiator by a simple process without the need to use a solvent would, therefore, be advantageous.

SUMMARY OF THE INVENTION

It is an object of the present invention to provide a process for the production of a co-initiated polyether polyol from a polyhydroxyl compound that is normally solid at processing conditions without the need to use large quantities of a solvent that must be removed prior to use of that co-initiated polyol and without generating large amounts of low functionality diols.

It is also an object of the present invention to provide a more efficient and economical process for the production of a co-initiated polyether polyol having a functionality of at least 4 from a polyhydroxyl compound that is normally solid at processing conditions.

It is a further object of the present invention to provide a co-initiated polyol for the production of rigid polyurethane foams which produces foams having properties comparable to foams made with polyols formed by the conventional method for producing blends, i.e., combining individual polyols.

These and other objects which will be apparent to those skilled in the art are accomplished by suspending a solid polyhydroxyl initiator having a functionality of at least 4 and a melting or decomposition point above 95° C. in an amine-initiated polyol, heating the suspension, (preferably, in the presence of an alkaline catalyst) and alkoxylating the resultant mixture. The alkaline catalyst may then be neutralized and/or removed from the alkoxylated mixture. The alkoxylation product may then be used in a process for the production of rigid polyurethane foams.

DETAILED DESCRIPTION OF THE PRESENT INVENTION

The present invention relates to a new method for producing co-initiated polyether polyols from polyhydroxyl compounds that are solids at ambient temperature without the use of an inert solvent such as toluene or the large quantities of water necessary to suspend or dissolve the solid polyhydroxy compound. In this method, at least one solid polyhydroxyl compound is suspended in at least one amine-initiated polyol, the suspension is heated to or maintained at a temperature of at least 80° C. in the presence of an alkaline catalyst and subsequently alkoxylated. The alkaline catalyst is then neutralized and/or removed from the alkoxylated mixture by any of the known techniques such as neutralization with sulfuric acid or lactic acid, extraction or decantation. The resultant alkoxylated mixture may then be used to prepare rigid polyurethane foams.

The solid polyhydroxyl compounds useful as the initiator to be suspended in the amine-initiated polyol have a hydroxyl group functionality of at least 4 and melt at temperatures above 95° C. or decompose before melting. Examples of suitable polyhydroxyl compound initiators include: pentaerythritol, dipentaerythritol, glucose, sorbitol, lactose, mannitol, fructose, sucrose, hydrolyzed starches, saccharide and polysaccharide derivatives such as alpha-methylglucoside and alpha-hydroxyethyl-glucoside. Sorbitol, sucrose, and pentaerythritol are particularly preferred.

The amine-initiated polyol in which the solid polyhydroxyl compound is suspended may be any of the known amine-initiated polyether polyols which is liquid at temperatures of from about 70 to about 150° C., has a viscosity at the processing temperature which is sufficiently low that it will form a suspension that can be stirred, and has a hydroxyl number sufficiently high that upon alkoxylation the co-initiated polyether polyol product will have the predetermined hydroxyl number of greater than 300 mg KOH/g. The hydroxyl number of the amine-initiated polyols will generally be at least 500, preferably at least 550, most preferably at least 600 mg KOH/g. The hydroxyl numbers given herein are determined in accordance with ASTM D-2849-69, Method C.

Examples of suitable amines that may be used to prepare the amine-initiated polyether polyols satisfying these criteria include: 2,4'-, 2,2'-, and 4,4'-methylene dianiline; 2,6- or 2,4-toluene diamine and vicinal toluene diamines; p-aminoaniline; 1,5-diaminonaphthalene; mixtures of methylene dianiline and its higher homologs; ethylene diamine, propylene diamine; diethylene triamine; 1,3-diaminopropane; 1,3-diaminobutane; and 1,4-diaminobutane. Ethylene diamine and toluene diamines are particularly preferred. Ammonia and aminoalcohols which can be prepared by the alkoxylation of ammonia are not included among the amine-initiators to be used in the amine-initiated polyols required for the practice of the present invention.

The amine-initiated polyols may be produced by any of the known methods. Generally, such polyols are produced by alkoxylating the amine initiator, either with or without an alkaline catalyst, until the desired hydroxyl number has been attained.

Suitable alkoxylating agents include any of the known alkylene oxides such as ethylene oxide, propylene oxide, butylene oxide, amylene oxide, and mixtures thereof. Ethylene oxide and propylene oxide are preferred.

In accordance with the present invention, the solid polyhydroxyl compound initiator is added to the liquid amine-initiated polyol and stirred, mixed or agitated sufficiently to disperse the polyhydroxyl compound initiator in the amine-initiated polyol and form a solution or a suspension. The amine-initiated polyol is generally used in an amount that is at least 30% by weight (based on the weight of the solid polyhydroxyl compound), preferably at least 40% by weight, most preferably, at least 50% by weight.

The addition of solid polyhydroxyl compound to the amine-initiated polyol is generally carried out at a temperature less than 120°, preferably from about 70 to about 110° C., most preferably from about 80 to about 100° C.

In addition to the solid polyhydroxyl compound, other starting materials commonly used in the production of polyether polyols and any of the catalysts commonly used to produce polyether polyols may, optionally, also be included in the suspension. Examples of other starting materials that may optionally be included in the suspension are small quantities of water, ethylene glycol, propylene glycol and glycerine. As used herein, "small quantities of water" means less than about 10% by weight, based on the weight of the solid polyhydroxyl compound initiator, including water added with any aqueous catalyst solution. The total quantity of these other, optional, starting materials should not, however, be greater than 25% by weight, based on the weight of the solid polyhydroxyl compound initiator.

Examples of catalysts that may be included in the suspension include potassium hydroxide and sodium hydroxide. When sucrose is used as the solid polyhydroxyl compound initiator, an alkaline catalyst such a potassium hydroxide should be included in the solution or suspension.

After the suspension of the solid polyhydroxyl compound in the amine-initiated polyol has been formed, the suspension is adjusted to a temperature of from about 80 to about 150° C., preferably from about 90 to about 140° C., most preferably from about 100 to about 130° C. This heated suspension is then alkoxylated in accordance with any of the procedures known to those skilled in the art using an alkylene oxide such as ethylene oxide and/or propylene oxide at a temperature of from about 80 to about 150° C., preferably from about 90 to about 140° C., most preferably from about 100 to about 130° C. This alkoxylation is carried out until the desired hydroxyl number is attained. The co-initiated polyol of the present invention will generally have a hydroxyl number of from about 300 to about 600, preferably from about 350 to about 550, most preferably from about 400 to about 500 mg KOH/g, and a number average functionality of from about 4 to about 6, preferably from about 4 to about 5.

However, it is also possible to produce a co-initiated polyether polyol having a lower or a higher hydroxyl number by simply increasing or decreasing the amount of alkoxylation agent added. It is also possible to produce a co-initiated polyether polyol having a higher or lower functionality by selecting an amine-initiated polyol having a different functionality or by varying the ratio of amine polyol to solid polyhydroxyl compound to any other starter material used.

A key feature of the present invention is the ability to produce a polyether polyol from a solid polyhydroxyl compound without the use of added solvent and without sacrificing any of the product properties. The absence of a solvent makes it possible to produce the desired co-initiated polyether polyol in greater quantity without increasing the volume of the reaction vessel. Further, the production cycle time is reduced because there is no need for the additional processing step of solvent removal. Finally, safety, health and environmental concerns encountered with use of solvents such as flammability, toxicity, and environmental releases are avoided.

After any alkaline catalyst present has been neutralized and/or removed, the co-initiated polyether polyols produced in accordance with the present invention may be used for the production of rigid polyurethane foams in accordance with known methods. These co-initiated polyether polyols may be used alone or in combination with other polyols.

Other polyols which may optionally be used in combination with the co-initiated polyether polyols of the present invention include polyether polyols prepared from liquid polyhydroxyl compounds, polyether polyols prepared from polyhydroxyl compounds having functionalities of less than 4, polyether polyols prepared from ammonia or aminoalcohols, polyester polyols and combinations thereof.

The additives and processing aids typically included in the polyol component of a foam-forming mixture may, of course, be added to the co-initiated polyether polyols of the present invention prior to use of the co-initiated polyether polyol to produce a rigid polyurethane foam. Examples of such suitable additives and processing aids include: catalysts, blowing agents, water, chain extenders, crosslinking agents, surfactants, foam stabilizers, cell regulators, fillers, dyes, pigments, flame retardants, hydrolysis protection agents, fungicides and bacteriocides.

Suitable catalysts include organometallic, preferably organotin catalysts, and tertiary amine catalysts. Examples of suitable tin catalysts are tin (II) acetate, tin (II) octanoate, tin (II) laurate, dialkyl tin diacetates, and dibutyl tin dichloride. Examples of suitable tertiary amine catalysts include: N,N-dimethyl cyclohexyl amine, pentamethyl diethylene triamine, and N, N', N"-tris(3-dimethyl aminopropyl) hexahydro-S-triazine. Tertiary amines are the preferred catalysts.

Suitable blowing agents include any of those known in the art used singly or in combination. Hydrocarbons, hydrofluorocarbons (HFCs), and hydrochlorofluorocarbons (HCFCs) and carbon dioxide generated from the reaction of water with an isocyanate are particularly suitable. Specific examples of suitable blowing agents are: 1,1-dichloro-1-fluoroethane (HCFC 141b), 1,1,1,2-tetrafluoro-ethane (HFC 134a), chlorodifluoromethane (HCFC 22), 1-chloro-1,1-difluoroethane (HCFC 142b), 1-chloro-1,2,2,2-tetrafluoroethane (HCFC 124), 1,1,2,2-tetrafluoroethane (HFC 134), 1,1,1,3,3-pentafluoropropane (HFC 245fa), 1,1,1,3,3-pentafluorobutane (HFC 365mfc), 1,1,1,4,4,4-hexafluorobutane (HFC 356mffm), cyclopentane, isopentane, cyclo-hexane, and isobutane. Hydrocarbons and HFC's are the most preferred blowing agents because they have a zero ozone depletion potential.

The isocyanates which may be reacted with the co-initiated polyols of the present invention include any of the known aliphatic isocyanates, aromatic isocyanates, modified isocyanates, and isocyanate-terminated prepolymers. The isocyanate will generally have at least two isocyanate groups, preferably from 2 to 3 isocyanate groups per molecule. Examples of suitable isocyanates are: toluene diisocyanate (TDI), prepolymers of toluene diisocyanate, methylene diphenyl diisocyanate (MDI), prepolymers of methylene diphenyl diisocyanate, polymeric methylene diphenyl diisocyanate (PMDI), and prepolymers of polymeric methylene diphenyl diisocyanate.

The isocyanate and the isocyanate-reactive component in which the co-initiated polyols of the present invention are present are generally reacted in amounts such the ratio of NCO to OH groups is from about 0.9 to about 3.0, preferably from about 1.0 to about 2.0, most preferably from about 1.05 to about 1.5.

Polyurethane foams made from the co-initiated polyether polyols of the present invention are characterized by physical properties comparable to those of foams made using mixtures of individual polyether polyols having the same amine and the same polyhydroxyl compound initiators and the same average hydroxyl numbers despite their inherent structural differences.

Having thus described our invention, the following Examples are given as being illustrative thereof. All parts and percentages given in these Examples are parts by weight and percentages by weight, unless otherwise indicated.

EXAMPLES

The materials used in the Examples were as follows:

POLYOL A: A polyether polyol prepared by propoxylating ethylene diamine having a hydroxyl number of about 770 mg KOH/g and a functionality of about 4 which is commercially available from Bayer Corporation under the designation Multranol 9181.

POLYOL B: A polyether polyol prepared by alkoxylating a sucrose, propylene glycol and water starter having a hydroxyl number of about 470 mg KOH/g and a functionality of about 5.2 which is commercially available from Bayer Corporation under the designation Multranol 9196.

POLYOL C: An aromatic amine-initiated polyether polyol having a hydroxyl number of about 395 mg KOH/g and a functionality of about 4 which is commercially available from Bayer Corporation under the designation Multranol 8114.

POLYOL D: An aromatic polyester polyol blend having a hydroxyl number of about 240 mg KOH/g and a functionality of about 2.0 which is commercially available from Stepan Company under the designation Stepanpol PS 2502A.

ISOCYANATE A: A modified polymethylene polyphenyl polyisocyanate prepolymer having an NCO content of about 28.0% which is commercially available from Bayer Corporation under the designation Mondur E-577.

SURFACTANT: A silicone-based surfactant that is commercially available from Air Products and Chemicals, Inc. under the designation Dabco DC 5357.

CATALYST A: N, N', N"-tris(3-dimethylaminopropyl)-hexahydro-S-triazine which is commercially available from Air Products under the designation Polycat 41.

CATALYST B: Pentamethyldiethylenetriamine which is commercially available from Rhein Chemie under the name Desmorapid PV.

HCFC 141b: 1,1-dichloro-1-fluoroethane.

Example 1

2502 g of POLYOL A were charged to a 5 gallon reactor along with 718 g of propylene glycol, 112 g of water, 288 g of 46% KOH and 4579 g of sucrose. The contents of the reactor were then agitated and heated to about 110° C. 3040 g of ethylene oxide were then added to the reactor over a period of 190 minutes while maintaining the temperature at about 110° C. and the pressure in the reactor below 30 psig. After addition of the ethylene oxide was completed, the contents of the reactor were allowed to react for a period of 60 minutes before the addition of propylene oxide was begun.

6450 g of propylene oxide were then added to the reactor which was maintained at a temperature of about 110° C. and at a pressure below 30 psig.

After addition of the propylene oxide had been completed, the contents of the reactor were allowed to react for 3 hours. After the 3 hour reaction time, sufficient lactic acid was added to the reactor contents to neutralize the KOH catalyst. Water was removed from the reaction mixture by distillation and the contents of the reactor were then removed and analyzed.

The properties of the resultant co-initiated polyether polyol, of the individual polyether polyols POLYOLS A and B (prepared from the same initiators and the same relative amount of ethylene oxide and propylene oxide), and of a blend of POLYOLS A and B in which the ratio of A:B was 1:6.2 are summarized in Table 1.

TABLE 1

| Property | POLYOL A | POLYOL B | 1:6.2 BLEND | CO-INITIATED POLYOL |
|---|---|---|---|---|
| OH Number (mg KOH/g) | 770 | 470 | 512 (calculated) | 510 |
| Viscosity (mPa · s at 25° F.) | 36,000 | 24,000 | — | 28,430 |
| % Water | ≦0.10 | ≦0.10 | ≦0.10 | 0.086 |

Example 2

1440 g of ortho-toluene diamine (o-TDA) were charged to a reactor and heated to about 115° C. 1799 g of ethylene oxide were then added to the reactor and allowed to fully react with the o-TDA over a period of 60 minutes to form the amine-initiated polyether polyol. The contents of the reactor were then cooled to 90° C. 3739 grams of sugar, 586 grams of propylene glycol, 99.1 g of water, and 202.5 g of 46% potassium hydroxide were then added to the reactor. The temperature of the reactor contents was then raised back to about 115° C. and an additional 2483 g of ethylene oxide were added and allowed to react for one hour. 8616 g of propylene oxide were then added to the reactor. After allowing the propylene oxide to react for 3 hours, the contents of the reactor were neutralized with lactic acid and water was removed by distillation. The contents of the reactor were then removed and analyzed.

The results of this analysis of the co-initiated polyether polyol, of the corresponding individual polyether polyols and of a blend of the individual polyether polyols in which the ratio of POLYOL B to POLYOL C is 2:1 are reported in Table 2.

TABLE 2

| PROPERTY | POLYOL B | POLYOL C | 2:1 BLEND OF B:C | CO-INITIATED POLYOL |
|---|---|---|---|---|
| Hydroxyl Number (mg KOH/g) | 470 | 390 | 443 (calculated) | 454 |
| Viscosity (mPa · s at 25° F.) | 24,000 | 9,000 | — | 18,277 |
| % Water | ≦0.10 | ≦0.10 | ≦0.10 | 0.028 |

Example 3

The materials listed in Table 3 were combined in the amounts indicated in the Table and reacted with the amount of ISOCYANATE A indicated in the Table to produce a rigid polyurethane foam. The properties of the resultant foams are also reported in Table 3.

TABLE 3

| Material or Property | SAMPLE A | SAMPLE B (COMPARATIVE) |
|---|---|---|
| Co-initiated polyol of Example 1 (parts by wt.) | 48.46 | — |
| POLYOL A (parts by wt.) | — | 6.73 |
| POLYOL B (parts by wt.) | — | 41.73 |
| POLYOL D (parts by wt.) | 18.84 | 18.84 |

TABLE 3-continued

| Material or Property | SAMPLE A | SAMPLE B (COMPARATIVE) |
|---|---|---|
| SURFACTANT (parts by wt.) | 2.26 | 2.26 |
| CATALYST A (parts by wt.) | 0.44 | 0.44 |
| CATALYST B (parts by wt.) | 0.89 | 0.89 |
| Water (parts by wt.) | 1.20 | 1.20 |
| HCFC 141b (parts by wt.) | 27.91 | 27.91 |
| ISOCYANATE A (parts by wt.) | 135.80 | 135.80 |
| Cream Time (sec) | 10 | 10 |
| Gel Time (sec) | 44 | 45 |
| Shrinkage | None | None |
| Minimum Fill Density (lb/ft$^3$) | 1.77 | 1.75 |
| Molded Panel Density (lb/ft$^3$) | 1.92 | 1.94 |
| % Thickness Increase after Demold | 1.0 | 1.0 |
| Initial k-factor(Btu-in./hr.-ft.$^2$-° F.) @ 75° F. | 0.118 | 0.118 |
| 1 Month k-factor(Btu-in./hr.-ft.$^2$-° F.) @ 75° F. | 0.133 | 0.133 |
| 3 Month k-factor (Btu-in./hr.-ft.$^2$-° F.) @ 75° F. | 0.145 | 0.146 |

Example 4

The materials listed in Table 4 were combined in the amount indicated in the Table and reacted with POLYISOCYANATE A in the amount indicated in the Table to produce a rigid polyurethane foam. The properties of the foams produced are also reported in Table 4.

TABLE 4

| Material or Property | SAMPLE C | SAMPLE D (COMPARATIVE) |
|---|---|---|
| POLYOL from Example 2 (parts by wt.) | 53.31 | — |
| POLYOL B (parts by wt.) | — | 35.52 |
| POLYOL C (parts by wt.) | — | 17.79 |
| POLYOL D (parts by wt.) | 14.84 | 14.84 |
| SURFACTANT (parts by wt.) | 2.38 | 2.38 |
| CATALYST A (parts by wt.) | 0.46 | 0.46 |
| CATALYST B (parts by wt.) | 0.92 | 0.92 |
| Water (parts by wt.) | 1.19 | 1.19 |
| HCFC 141b (parts by wt.) | 26.90 | 26.90 |
| ISOCYANATE A (parts by wt.) | 121.02 | 121.02 |
| Cream Time (sec) | 9 | 9 |
| Gel Time (sec) | 40 | 41 |
| Friability | None | None |
| Minimum Fill Density (lb/ft$^3$) | 1.68 | 1.69 |
| Molded Panel Density (lb/ft$^3$) | 1.94 | 1.92 |
| Core Density (lb/ft$^3$) | 1.63 | 1.64 |
| Initial k-factor(Btu-in./hr.-ft.$^2$-° F.) at 35° F. | 0.120 | 0.119 |
| Initial k-factor (Btu-in./hr.-ft.$^2$-° F.) at 75° F. | 0.126 | 0.127 |
| Perpendicular Compression Strength (lbs/in$^2$) @ 10% compression | 12.5 | 14.7 |
| Closed Cell Content (%) | 84.8 | 84.4 |

As these Examples illustrate, the co-initiated polyols of the present invention produce rigid polyurethane foams having substantially the same physical properties as foams produced from mixtures of individual polyols which the co-initiated polyols of the present invention are intended to replace. This substantial equivalence could not have been expected because the epoxide sequences and the hydroxyl numbers of the co-initiated polyols of the present invention are obviously different from those of individual polyether polyols used in the comparable polyol blends.

Although the invention has been described in detail in the foregoing for the purpose of illustration, it is to be understood that such detail is solely for that purpose and that variations can be made therein without departing from the spirit and scope of the invention except as it may be limited by the claims.

What is claimed is:

1. A process for the production of a co-initiated polyether polyol comprising:
   a) suspending
      (1) a polyhydroxyl compound which melts above 95° C. or decomposes before melting and has a hydroxyl group functionality greater than or equal to 4, in
      (2) an amine-initiated polyether polyol which
         (i) is a liquid,
         (ii) has a viscosity sufficiently low that stirring of the amine-initiated polyol, the polyhydroxyl compound (1) and any optional materials present is possible at processing conditions,
         (iii) has a hydroxyl number sufficiently high to permit reaction with enough ethylene oxide and/or propylene oxide to produce a co-initiated polyol having a selected hydroxyl number, and
         (iv) has a hydroxyl functionality greater than or equal to 4 in an amount such that a stirrable slurry or suspension is formed, and optionally,
      (3) a catalyst, and
      (4) a co-initiator which is different from (1) or (2),
   b) heating the slurry or suspension generated in step a) to or maintaining the slurry at a temperature of from about 80 to about 150° C., and
   c) reacting the heated slurry or suspension from step b) with ethylene oxide and/or propylene oxide to form the co-initiated polyol.

2. The process of claim 1 in which any catalyst present in the product of step c) is neutralized and/or removed.

3. The process of claim 1 in which polyhydroxyl compound (1) is selected from the group consisting of sucrose, sorbitol and pentaerythritol.

4. The process of claim 1 in which an alkaline catalyst is added to or incorporated into the suspension formed in step a).

5. The process of claim 1 in which the amine-initiated polyether polyol (2) is selected from the group consisting of ethylene diamine-initiated and toluene diamine-initiated polyether polyols.

6. The process of claim 1 in which no inert organic solvent is used.

7. The process of claim 1 in which step a) is carried out at a temperature of from about 80 to about 100° C.

8. The process of claim 1 in which step b) is carried out at a temperature of from about 100 to about 130° C.

9. The process of claim 1 in which at least 30% by weight (based on the weight of polyhydroxyl compound (1)) of the amine-initiated polyol (2) is used.

10. The co-initiated polyol produced by the process of claim 1.

11. The co-initiated polyol produced by the process of claim 3.

12. A process for the production of a rigid polyurethane foam comprising reacting the co-initiated polyol of claim 10 with an isocyanate.

13. A process for the production of a rigid polyurethane foam comprising reacting the co-initiated polyol of claim 11 with an isocyanate.

14. The rigid polyurethane foam produced by the process of claim 12.

15. The rigid polyurethane foam produced by the process of claim 13.

16. The process of claim 12 in which a blowing agent selected from the group consisting of hydrocarbons, hydrofluorocarbons, hydrochlorofluorocarbons, carbon dioxide generated from the reaction of water with an isocyanate or a combination thereof is included in the reaction mixture.

17. The process of claim 13 in which a blowing agent selected from the group consisting of hydrocarbons, hydrofluorocarbons, hydrochlorofluorocarbons, carbon dioxide generated from the reaction of water with an isocyanate or a combination thereof is included in the reaction mixture.

* * * * *